US006460594B1

(12) United States Patent
Lam

(10) Patent No.: US 6,460,594 B1
(45) Date of Patent: Oct. 8, 2002

(54) METHOD OF FORMING A METAL STATUETTE OF A THREE-DIMENSIONAL OBJECT

(75) Inventor: Sai Wing Lam, Kowloon (HK)

(73) Assignee: Hang Fung Jewellery Co., Ltd., Kowloon (HK)

( * ) Notice: Subject to any disclaimer, the term of this patent is extended or adjusted under 35 U.S.C. 154(b) by 0 days.

(21) Appl. No.: 09/237,681

(22) Filed: Jan. 27, 1999

(30) Foreign Application Priority Data

Mar. 16, 1998 (HK) .......................................... 98102176

(51) Int. Cl.$^7$ ............................. B22C 9/02; B22D 46/00
(52) U.S. Cl. ........................... 164/35; 164/45; 164/4.1; 205/72; 700/118; 356/612
(58) Field of Search ............................. 164/35, 34, 45, 164/235, 4.1; 205/72; 700/118; 356/612

(56) References Cited

U.S. PATENT DOCUMENTS

| 4,705,401 A |   | 11/1987 | Addleman et al. ........... 356/606 |
| 5,156,777 A |   | 10/1992 | Kaye ......................... 264/40.1 |
| 5,218,427 A |   | 6/1993 | Koch .......................... 356/602 |
| 5,594,989 A | * | 1/1997 | Greve ......................... 164/35 |
| 5,636,030 A |   | 6/1997 | Limbach ..................... 356/612 |
| 5,891,317 A | * | 4/1999 | Teichmann et al. ........... 205/72 |
| 5,926,388 A | * | 7/1999 | Kimbrough et al. ......... 700/118 |

FOREIGN PATENT DOCUMENTS

| EP | 0666127 | | 8/1995 | |
| JP | 61-47620 | * | 10/1986 | .................. 164/45 |

OTHER PUBLICATIONS

Lowenheim, Frederick A., "Electroplating", 1979, McGraw–Hill Book Company, p. 270.*
Rose, arthur and Elizabeth, "The Condensed Chemical Dictionary", 1969, Reinhold Book Corporation, Seventh Edition, p. 963.*

* cited by examiner

Primary Examiner—Tom Dunn
Assistant Examiner—I.-H. Lin
(74) Attorney, Agent, or Firm—Burns, Doane, Swecker & Mathis, L.L.P.

(57) ABSTRACT

A method of forming a gold statuette of a three-dimensional object, e.g. a man, is disclosed as including the steps of (1) scanning the man with scanning means to obtain data on his contour and shape; (2) inputting the data into a computer; (3) based on the data inputted into the computer, displaying a virtual three-dimensional image of the man on a monitor of the computer; (4) providing an epoxy resin prototype of the man by a sculpturing machine controlled by the computer; (5) providing silicon rubber mould-halves on the basis of the epoxy resin prototype; (6) providing a wax prototype on the basis of the silicon rubber mould-halves; (7) casting gold onto the wax prototype; (8) removing the wax, in which the scanning means revolves around the man to scan his contour and shape.

15 Claims, 4 Drawing Sheets

METHOD OF FORMING A METAL STATUETTE OF A THREE-DIMENSIONAL OBJECT

FIELD OF THE INVENTION

This invention relates a method of forming a statuette made of a metal, in particular a precious metal, e.g. gold, of a three-dimensional object.

SUMMARY OF THE INVENTION

According to the present invention, there is provided a method of forming a metal statuette of a three-dimensional object, including the steps of (a) scanning said object with scanning means to obtain data on the contour and shape of said object; (b) inputting said data into a computer; (c) based on said data inputted into the computer, providing an epoxy resin prototype of the object by a sculpturing machine controlled by the computer; (d) providing silicon rubber mould parts on the basis of the epoxy resin prototype; (e) providing a wax prototype on the basis of the silicon rubber mould parts; (f) casting the metal onto the wax prototype; and (g) removing the wax, characterized in that during scanning, said scanning means revolves around said object to scan the contour and shape of the object.

BRIEF DESCRIPTION OF THE DRAWINGS

The invention will now be described by way of an example, and with reference to the accompanying drawings, in which.

DETAILED DESCRIPTION

Figure 1:
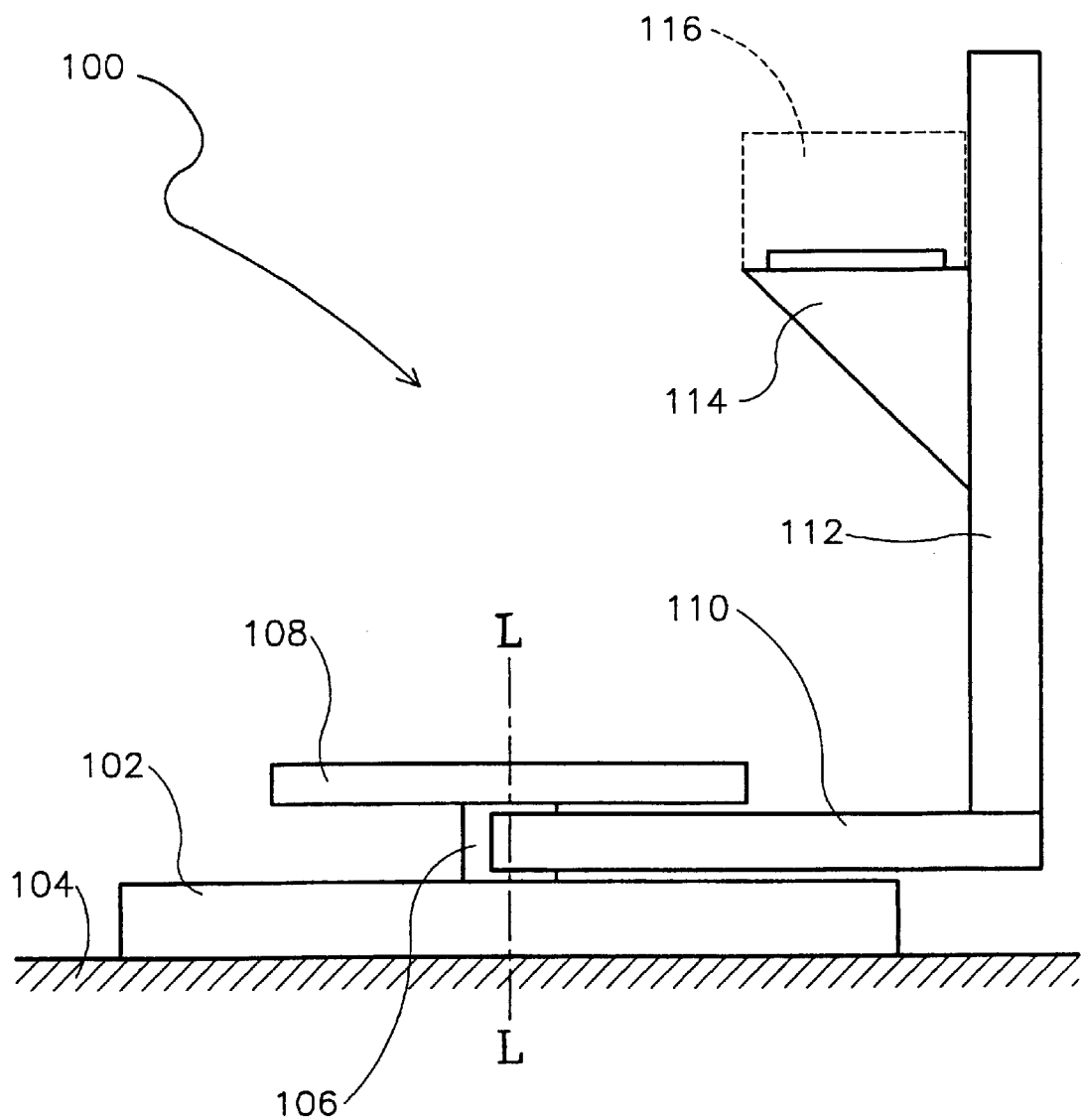
FIG. 1 is a side view of a platform used in the scanning procedure.

A system appropriate for scanning the object, obtaining and storing the relevant data, and subsequently manipulating the data, for the ultimate production of the statuette, may be one traded by Cyberware Inc. under the model number 3030 Digitizer. Such a system includes a scanner, a computer software under the name "ECHO", and a computer software under the name "CySurf". As shown in FIG. 1, a working platform of the scanning system is generally designated as 100, and includes a base 102 to be placed on a solid floor 104. Connected via an axle 106 above the base 102 is a raised platform 108. The object to be scanned, e.g. a man, may be situated on the platform 108 for scanning. Attached horizontally to the axle 106 is a rotary arm 110. A vertical arm 112 is attached to the outer end of the rotary arm 110. At the upper portion of the vertical arm 112 is secured a mounting platform 114 to which a scanner 116 (shown in dashed line) may be engaged. The scanner 116 is connected to a computer (not shown) containing the "ECHO" software for the storage and manipulation of the data obtained from the scanner 116.

Figure 2:
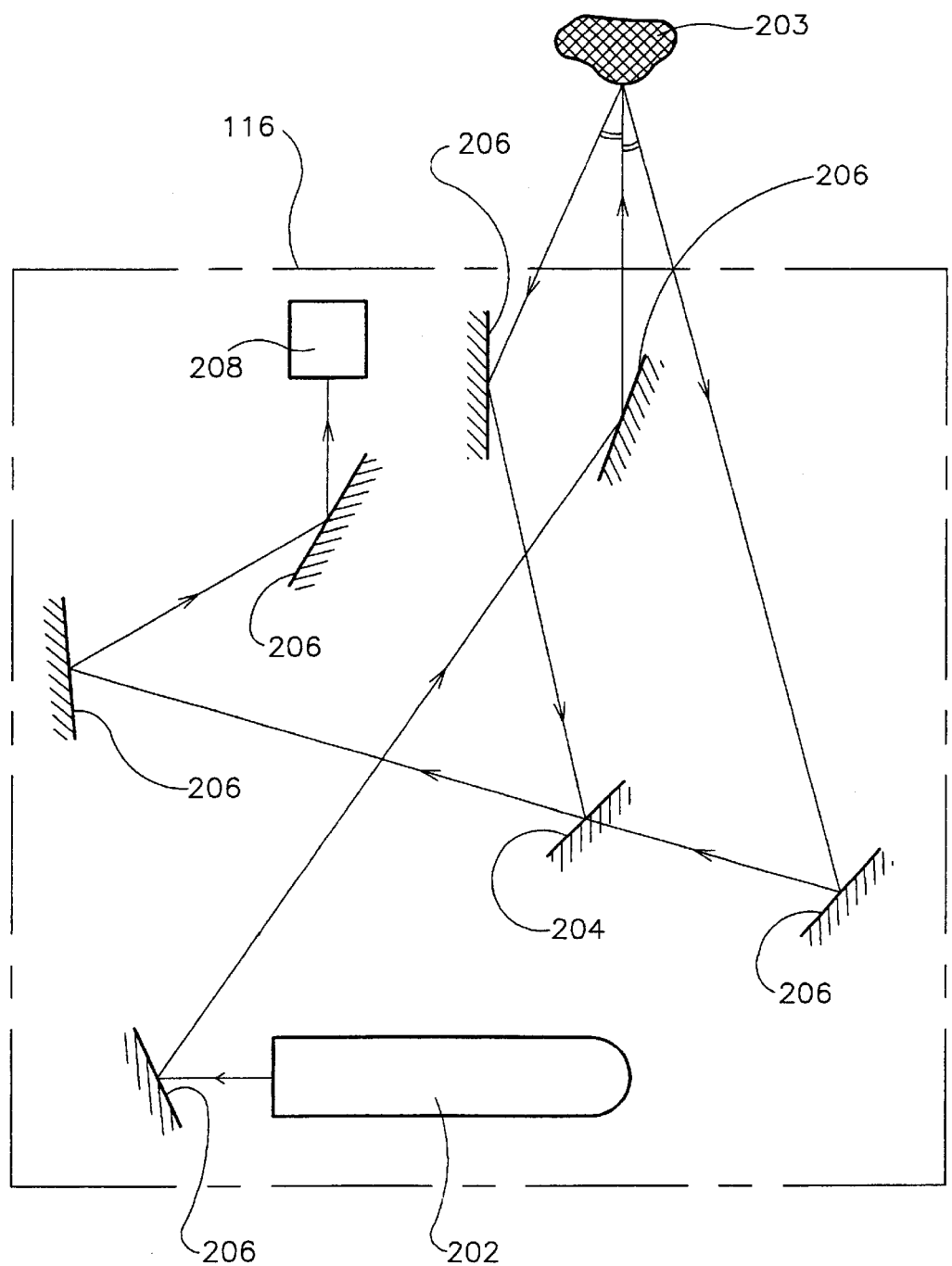
FIG. 2 is a schematic diagram showing the theory of operation of the scanner.

FIG. 2 shows schematically the theory of operation of the scanner 116. A laser tube 202 generates a laser line, which is directed towards an object 203 to be scanned. Laser light reflected from the object 203 is received via two viewing points at equal angles on both sides of the light source. A beam splitter (e.g. one-way mirror 204) overlays the two images, so that if one side is shadowed, the other side will normally contain the necessary data. A number of mirrors 206 are provided in the scanner 116 to direct the laser light to the appropriate destination. In particular, the reflected laser light is eventually received by a camera lens and charge-couple-device 208.

During the scanning process, the rotary arm 110, and thus the vertical arm 112 and the scanner 116 thereon, revolves/rotates about an axis L—L, which coincides with the longitudinal axis of the axle 106, while the platform 108 stays stationary. The rotary arm 110 revolves/rotates about the raised platform 108 at a constant speed. A servo motor is thus best suited for this purpose. Usually, a complete revolution takes roughly 25 seconds.

At each point of the scanning process, a series of (normally 512) data samples are taken vertically along the reflection of the line, and stored as the "range" of that point from the plane of reference. Such data represent the contour and shape of the object 203. As the scanner 116 moves relative to the object 203, repeated sets of such data samples (normally between 200 and 1,000) in machine-readable form are made and inputted into the computer to be stored as a grid of range values.

The system allows for compensation of the surface brightness of the object 203. The scanner 116 is of a resolution capable of scanning very fine details of the object 203, such as hair and wrinkles of a man. It is also possible to adjust the sensitivity of the scanner 116, so as to change the threshold of light strength that the scanner 116 will recognize.

The ECHO computer software is provided in a computer of the aforesaid system to control the scanning function of the scanner 116. The scanner 116 is interfaced to a computer which supports the processing of the large volumes of high resolution data created by the scanner 116. In addition, such data sets, or images, can be manipulated in a number of ways and then be reproduced in both a visual and solid form. Views of the data set, in particular virtual three-dimensional images of the scanned object, may be shown on a graphics display device (e.g. a visual display unit) of a graphics workstation in either wireframe or shaded form. Solid reproductions of images may be machined on computer controlled machine tools from a wide variety of materials. Such a function is utilized in the production of the statuette.

The CySurf data conversion computer program is also employed to read in the data from the ECHO computer software, colour scan, and produce corresponding colour and bump texture maps. In particular, further manipulation of the images may be effected via this software, in order to revise the images. Various commands may be inputted, e.g. by a mouse or a keyboard, for analyzing and manipulating the images. Such manipulation may include scaling, clipping or smoothing the images. Such functions can be used in adjusting, say, the way a man smiles or the hair style as shown in the image(s), which will also be reflected in the resultant statuette. The resultant data are also converted by the CySurf computer software into a format proper for use in the control and operation of the Stereo Lithography Apparatus (SLA), to be discussed below.

Figure 4:
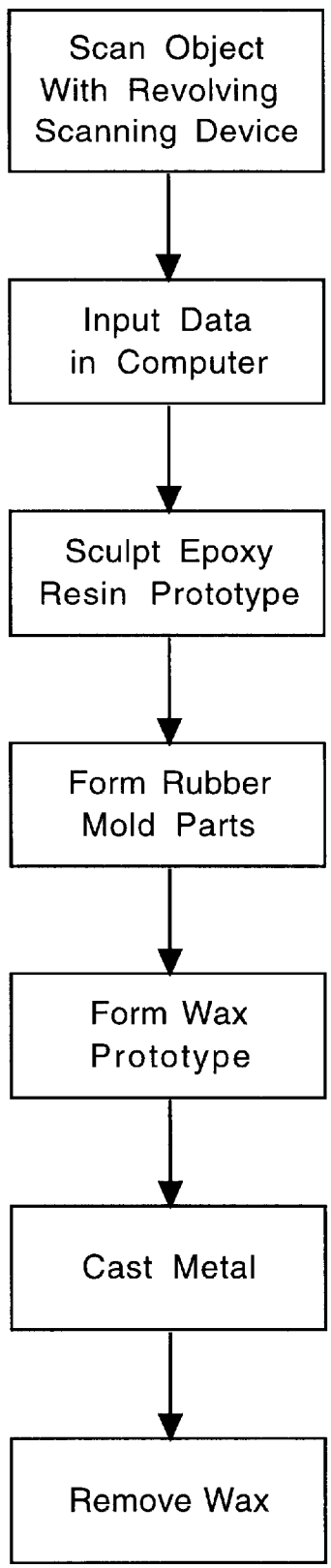
FIG. 4 is a flow chart of the method of the invention.

On the basis of the resultant data stored in the computer of the aforesaid scanning system, and as shown on the monitor, a metal statuette is formed in accordance with the procedure depicted in FIG. 4. A Stereo Lithography Apparatus (SLA) is used for sculpturing an epoxy resin prototype. Epoxy resin is the material authorized for use with such a machine. An appropriate SLA may be one traded by 3D Systems under the model number 500, which is controlled by a computer software traded by 3D Systems under the trade name Maestro™.

Stereo Lithography is a three-dimensional printing process that produces a solid plastics model. Data obtained in the scanning process are converted to a planar faceted representation or contoured representation for use by the Maestro™ software and the SLA buildstation. Such data are then "sliced" into very thin cross sections. The resulting slice sections are then transformed into files to be used at the SLA buildstation. A laser generating a small, intense beam of ultraviolet (UV) energy is moved by a computer-controlled optical scanning system across the top of a vat containing liquid epoxy resin. In particular, the data obtained from the aforesaid scanning process and manipulated by the "ECHO" and "CySurf" computer software are used by the SLA to control the deflecting mirrors which direct the laser beam on the resin surface. As the laser beam comes into contact with the liquid epoxy resin, it transforms the epoxy resin from liquid form into solid form.

At the completion of a layer, an elevator dips the newly formed layer into the vat and then returns it to the correct height for the next layer. The liquid resin on top is then leveled by a sweeper blade to the proper thickness. This process continues until the final layer has been drawn. The resultant epoxy resin prototype is then removed, cleaned and illuminated with high intensity UV energy to complete the polymerization process.

A pair of silicon rubber mould-halves are then manufactured on the basis of the epoxy resin prototype. Each of these mould-halves has a recessed surface. When the recessed surfaces of the mould-halves contact, and are properly aligned with, each other, they combine to form an internal cavity which is identical or substantially identical to the epoxy resin prototype. Wax is then filled or injected into the internal cavity formed of the silicon rubber mould-halves. Upon drying of the wax, the silicon rubber mould-halves are removed so that a wax prototype can be retrieved. The wax prototype is then polished by a polishing machine. Minor adjustments may also be made to the wax prototype manually.

Upon completion of the wax prototype, silver paste is painted onto its outer surface. A layer of copper is then electroplated onto the prototype. This procedure takes about five (5) hours. The wax prototype is then cleansed with sulfuric acid and distilled water. It is subsequently cleansed by distilled water to remove any remaining acidic substances. The wax prototype is then inserted into a tank of an electro-forming machine for electro-casting for roughly twenty (20) hours, for deposition of gold on the surface of the prototype. Such a machine may be one traded by Sansha Electric Mfg. Co., Ltd. (of Japan) under the name SanRex DC AUTO (Trade Mark). The necessary chemicals contained in the tank include gold cyanide, potassium cyanide, a brightening agent, an electroplating solution and distilled water. The brightening agent may be one traded by Chartermate International Limited under the name "ELCONEL 100-24K", and the electroplating solution may be one traded by Elix Chemie under the Trade Mark "ELIX". In the electro-casting process, gold cyanide is converted into gold for subsequent casting onto the wax prototype. The chemicals must be of an amount sufficient for the whole electro-casting procedure. The amount of the various chemicals required for the whole electro-casting procedure is therefore determined and calculated beforehand. Technicians inspect the electro-casting procedure at least once an hour to ensure that the procedure proceeds as it should.

After the electro-casting procedure, a hole is made in the bottom part of the resultant statuette, e.g. by drilling. The whole statuette is then heated in water to dissolve some of the wax, which is drained away from the statuette from the bottom hole. The statuette is then treated in a solution of wax removing agent, e.g. trichloroethylene to remove the remaining wax. The statuette is then cleansed with water to remove the trichloroethylene. The statuette is then heated in hydrochloric acid and water to remove any remaining trichloroethylene. The statuette is subsequently heated in nitric acid and water, in order to remove the copper. After removal of the copper, the statuette is then cleansed with water. The statuette is placed in a trough of hot water for about fifteen minutes to remove nitric acid. The statuette is again cleaned with heated nitric acid and water. It is then cleansed with distilled water. The statuette is then put in an oven at a temperature of around 500° C. for about twenty minutes. The statuette may then be polished by a polishing machine, with possible further minor adjustments carried out manually by a technician.

Figure 3:
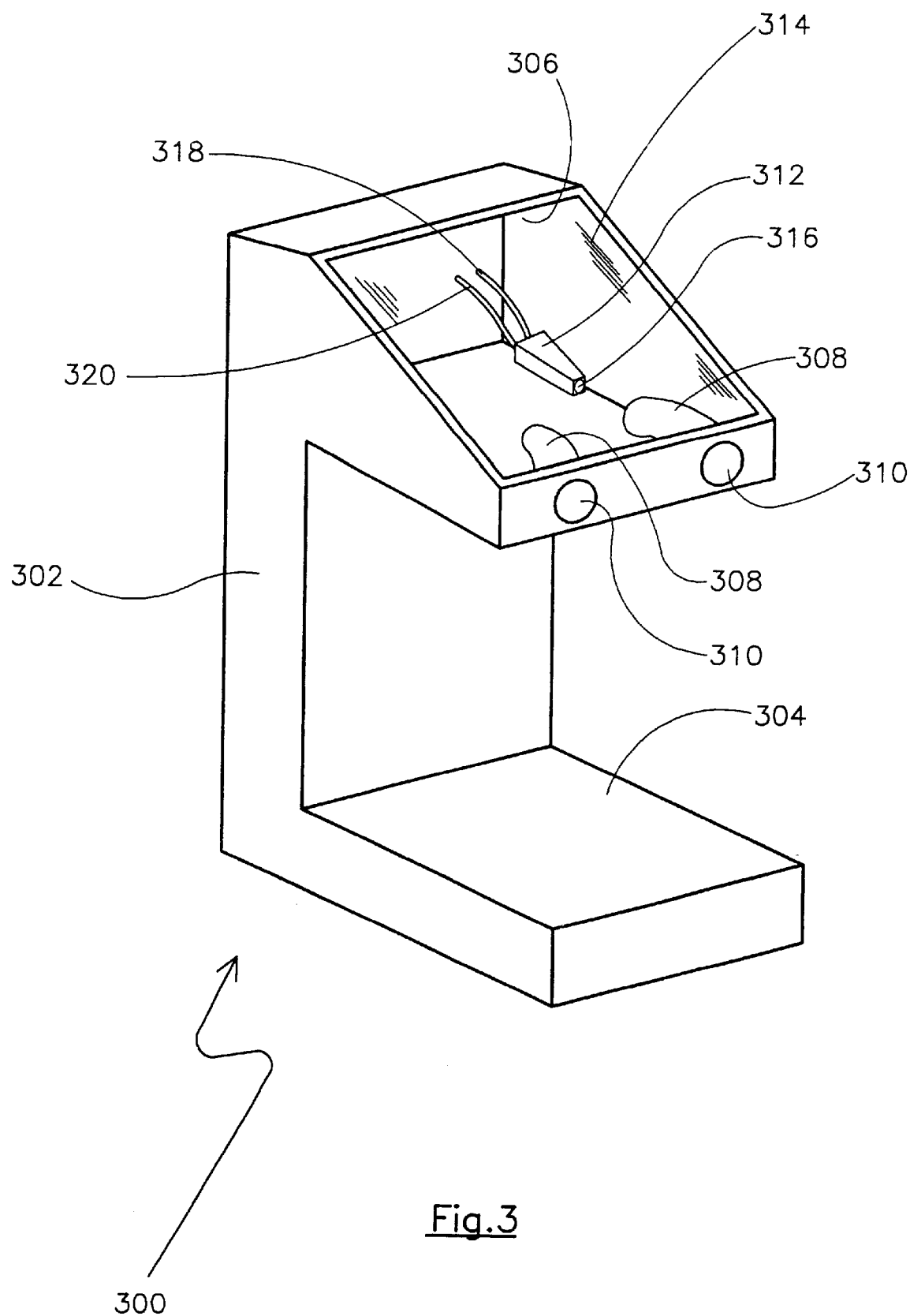
FIG. 3 shows a blasting machine suitable for use in the blasting procedure.

The statuette is then blasted by with abrasives by a blasting machine to enhance its outward appearance. An appropriate blasting machine may be one traded by Vapormatt Limited under the trade name "VAPORMATE Mk, 2:. As shown in FIG. 3, a blasting machine generally shown as 300 includes a body 302 with a base 304 and a blasting chamber 306 into which two gloves 308 may extend. Hands of an operator (not shown) may extend through openings 310 of the gloves 308 in order to manipulate an object (not shown) in the chamber 306, and operate a nozzle 312. The chamber 306 is closable, e.g. pivotably, by a window 314 for protective purpose. The window 314 is also transparent, thus allowing the operator to observe and monitor the blasting process in the chamber 306.

An opening 316 is provided at a front end of the nozzle 312. To a rear end of the nozzle 312 are attached an air supply hose 318 and an abrasive supply hose 320, which supply, respectively, air and abrasives to the nozzle 312. A stream of abrasives may thus be delivered by the nozzle 312 out from its opening 316 for the blasting process. An operator may hold the statuette to be blasted (if it is of a sufficiently light weight) with one glove 308, and hold the nozzle 312 with another glove 308, and direct the stream of abrasives from the nozzle 312 towards the surface of the statuette. Heavier statuettes may be placed on supports in the chamber 306 and the stream of abrasives directed there against accordingly.

The pressure at which the nozzle 312 is operated is normally within the range of 20 to 80 psi. The surface finish of the statuette s depends on three factors: (i) the pressure at which the nozzle 312 is operated; (ii) the type of abrasives used; and (iii) the distance and angle at which the nozzle 312 is placed relative to the statuettes. The normal distance between the nozzle 312 and the statuettes is usually within the range of 50 to 150 mm.

The statuette is then heated in fire until it becomes red hot. Afterwards, it is cleaned in a tough of hydrochloric acid, and then clensed with distilled water to remove remaining hydrochloric acid. The statuette is then immersed in a tough of hot water and soap or detergent, and subsequently cleansed with distilled water.

For final polishing, it is possible to use agate or steel to press the areas which are intended to be shiny until they become shiny. After this procedure, the statuette is once again cleansed with hot water, and subsequently cleaned with steam. The statuette is then placed in the oven and dried at a temperature of about 300° C.

It should be understood that the above only describes an example whereby the present invention can be carried out, and that various modifications and alterations may be made thereto without departing from the spirit of the invention.

What is claimed is:

1. A method of forming a metal statuette of a three-dimensional object, including the steps of:
    (a) scanning said object with scanning means that revolves around said object to obtain data on the contour and shape of said object;
    (b) inputting said data into a computer;
    (c) based on said data inputted into the computer, providing an epoxy resin prototype of the object by a sculpturing machine controlled by the computer;
    (d) providing silicon rubber mould parts on the basis of the epoxy resin prototype;
    (e) providing a wax prototype on the basis of the silicon rubber mould parts;
    (f) casting metal onto the wax prototype; and
    (g) removing the wax.

2. A method according to claim 1 further including the step of providing a layer of silver paint on the surface of the wax prototype.

3. A method according to claim 2 further including the step of electroplating copper onto the layer of silver paint.

4. A method according to claim 3 further characterized in that copper is electroplated onto the layer of silver paint for substantially five hours.

5. A method according to claim 3 further characterized in that said metal is electro-cast onto said copper electroplated onto the wax prototype.

6. A method according to claim 1 further characterized in that said metal is gold.

7. A method according to claim 6 further characterized in that gold is electro-cast onto said wax prototype with a solution containing gold cyanide, potassium cyanide, an electroplating solution and distilled water.

8. A method according to claim 1 further characterized in that the step of removing the wax includes the steps of:
    (h) opening a hole at the bottom of the metal statuette; and
    (i) heating the metal statuette in a solution of wax removing agent.

9. A method according to claim 8 further characterized in that said wax removing agent is trichloroethylene.

10. A method according to claim 9 further including the steps of:
    (j) treating the metal statuette with hydrochloric acid; and
    (k) cleaning the metal statuette with distilled water.

11. A method according to claim 10 further including the step of drying said metal statuette in an oven.

12. A method according to claim 10 further including the step (1) of treating the metal statuette with nitric acid.

13. A method according to claim 9 further including the step of treating the metal statuette with nitric acid.

14. A method according to claim 11 further including the step of drying said metal statuette in an oven.

15. A method according to claim 1 further including the steps of:
    (m) storing in the computer the data inputted into the computer in step (b);
    (n) inputting instructions into said computer to modify the data inputted into the computer and thereby to vary a virtual three-dimensional image displayed on a visual display unit of the computer;
    (o) providing the epoxy resin prototype according to the data as modified in step (n).

* * * * *